US008854189B2

(12) United States Patent
Kovacic et al.

(10) Patent No.: US 8,854,189 B2
(45) Date of Patent: Oct. 7, 2014

(54) METHOD FOR A SECURE NON-VOLATILE LOGGING IN AN ACTIVE RFID TAG OF A PROCESS IN A TAGGED ARTICLE

(75) Inventors: Kosta Kovacic, Maribor (SI); Anton Pletersek, Orehova Vas (SI); Andrej Vodopivec, Ljubljana (SI); William Peyton Roberts, Spartanburg, SC (US); Oluf Alminde, Lachon (CH)

(73) Assignee: AMS R&D D.O.O., Ljubljana (SI)

( * ) Notice: Subject to any disclaimer, the term of this patent is extended or adjusted under 35 U.S.C. 154(b) by 477 days.

(21) Appl. No.: 13/138,108

(22) PCT Filed: Jan. 6, 2010

(86) PCT No.: PCT/SI2010/000001
§ 371 (c)(1),
(2), (4) Date: Sep. 22, 2011

(87) PCT Pub. No.: WO2010/080073
PCT Pub. Date: Jul. 15, 2010

(65) Prior Publication Data
US 2012/0044055 A1 Feb. 23, 2012

(30) Foreign Application Priority Data
Jan. 7, 2009 (SI) .................................. 200900006

(51) Int. Cl.
*H04Q 5/22* (2006.01)
*G08B 1/08* (2006.01)
*G06K 19/07* (2006.01)
(52) U.S. Cl.
CPC ........ *G06K 19/0723* (2013.01); *G06K 19/0717* (2013.01)
USPC .................... 340/10.1; 340/10.4; 340/539.22; 340/539.26

(58) Field of Classification Search
USPC .................... 340/10.1, 10.4, 539.22, 539.26
See application file for complete search history.

(56) References Cited

U.S. PATENT DOCUMENTS 6,294,997 B1 * 9/2001 Paratore et al. ............ 340/572.1
6,917,291 B2 * 7/2005 Allen .......................... 340/572.1
(Continued)

FOREIGN PATENT DOCUMENTS

CN      1719457 A      1/2006
DE      19955120 A1      5/2001
(Continued)

OTHER PUBLICATIONS

Larry Coffman et al.; "An Advanced Sustainable Stormwater Treatment System"; pp. 1-9, 2008.

*Primary Examiner* — Daniel Wu
*Assistant Examiner* — Emily C Terrell
(74) *Attorney, Agent, or Firm* — McDermott Will & Emery LLP

(57) ABSTRACT

Prior to logging of a process flags for locking at all addresses of a logging area of a tag are set to state 1 by means of an interrogator. A high limit (h) and a low limit (l) of an interval (l-h) of such values (v) of a physical parameter are determined, which are proper for preserving usability of a tagged article. Said values (v) acquired with a sensor and acquisition times related thereto are converted into less numerous data characterizing the process by observing said limits (h, l). Said data characterizing the process are logged in said logging area. Said process log cannot be modified in any way at a later stage. The invention also provides for an efficient observation of longer period of the process in the tagged article in order to inspect the usability thereof.

6 Claims, 1 Drawing Sheet

(56) References Cited

U.S. PATENT DOCUMENTS

| | | | |
|---|---|---|---|
| 7,151,453 B2 * | 12/2006 | Ebert | 340/572.1 |
| 7,278,571 B2 * | 10/2007 | Schmidtberg et al. | 235/383 |
| 7,327,260 B2 * | 2/2008 | Himberger et al. | 340/572.1 |
| 7,796,038 B2 * | 9/2010 | Batra | 340/572.1 |
| 2005/0168325 A1 * | 8/2005 | Lievre et al. | 340/10.6 |
| 2005/0248455 A1 * | 11/2005 | Pope et al. | 340/539.27 |
| 2006/0080819 A1 * | 4/2006 | McAllister | 29/403.3 |
| 2006/0145863 A1 * | 7/2006 | Martin et al. | 340/572.8 |
| 2007/0096880 A1 * | 5/2007 | Nagai | 340/10.41 |
| 2008/0136596 A1 | 6/2008 | Yeo et al. | |
| 2008/0136600 A1 * | 6/2008 | Yeo et al. | 340/10.4 |
| 2008/0231438 A1 | 9/2008 | Curcio | |

FOREIGN PATENT DOCUMENTS

| | | |
|---|---|---|
| GB | 2308947 A | 7/1997 |
| GB | 2413197 A | 10/2005 |
| WO | WO 2004/023391 A1 | 3/2004 |
| WO | WO 2007/145911 A2 | 12/2007 |

* cited by examiner

METHOD FOR A SECURE NON-VOLATILE LOGGING IN AN ACTIVE RFID TAG OF A PROCESS IN A TAGGED ARTICLE

This is a national stage of PCT/SI10/000,001 filed Jan. 6, 2010 and published in English, which claims the priority of Slovenia number P-200900006 filed Jan. 7, 2009, hereby incorporated by reference.

The invention relates to a method for a secure non-volatile logging in an active RFID tag foreseen for a frequency band at 13.56 MHz to store a process running in a tagged article by acquiring values of a physical parameter in subsequent sampling periods by means of a sensor situated within the active RFID tag, which values determine said process running in the tagged article at acquisition times, and the process log represents an important information for inspection or finding out whether the tagged article remained usable after having been observed for a certain period of time.

Apart from identifying an article, an active RFID tag that also comprises a sensor integrated within its integrated circuit or an external sensor for acquiring values of a certain physical parameter, e.g. a sensor for acquiring temperature, also logs a process running in the tagged article, for example during transport or storing, by acquiring the values of said physical parameter. The process log represents an important information for inspecting or finding out whether usability of the tagged article was conserved.

In subsequent sampling periods a data logger in such active RFID tag automatically, i.e. without any influence of an interrogator in the RFID system, to which the active RFID tag pertains, activates acquisition and thereafter analogue-to-digital conversion of values of said physical parameter as well as the acquisition times related thereto and logs said data in a non-volatile memory of the active RFID tag. The interrogator only activates the data logger at the beginning when the active RFID tag is put into operation.

Figure 1:
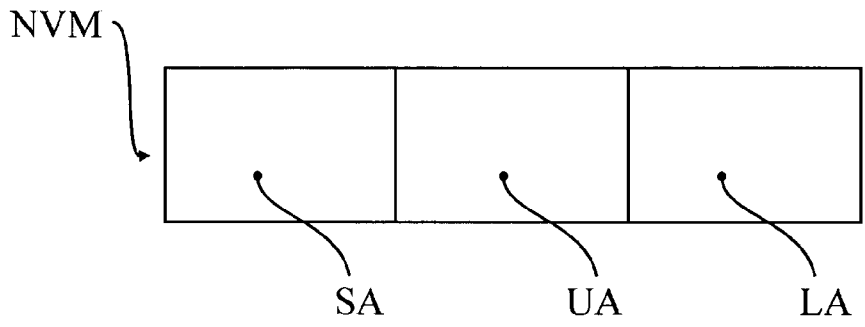

A non-volatile memory NVM within the active RFID tag is divided into three areas (FIG. 1). Parameters necessary for the operation of the integrated circuit within the active RFID tag are logged in a system area SA. User data are logged in a user area UA of the non-volatile memory NVM. The values of said physical parameter acquired by the sensor or the data derived therefrom are logged in a logging area LA.

The active RFID tag is provided with the non-volatile memory NVM, the logging area LA of which usually has a memory capacity of up to a thousand addresses. The result of the acquisition of one value of said physical parameter is logged at one address. The logging of the process at a sampling period of ten minutes can therefore proceed only within a period of seven days. This period is normally sufficient to inspect whether usability of the tagged article has been preserved after a completed road transport. However, this period is often too short for a ship transport. A longer period could be achieved by means of a longer sampling period, however, some important events of said process could fail to be noticed in case of a too long sampling period.

An active RFID tag, in which the acquisition of values of said physical parameter is activated manually, is also known (WO2007/145911A2). The tag raises alarm, when the value of said physical parameter exceeds a certain value or drops below it. This might be a consequence of an extraordinary event during the observation of the process, and in this case the information on duration or occurence frequency of the abnormal value of said physical parameter will be missing.

On the other side, there is a high probability that the process logged in the active RFID tag will be falsified. Some standards foresee an enciphering of data prior to logging, which contributes to a high security level of logged data. Enciphering of data is not used if the existing infrastructure of the RFID system is to be preserved. However, it should be taken into consideration that access to the non-volatile memory NVM within the active RFID tag for a frequency band at 13.56 MHz is not restricted (Standard ISO 15693).

This is the reason why protection against an unauthorized access to a non-volatile memory of such RFID tag is proposed by using a password that an interrogator has to append to each instruction (GB 2 413 197 A). All interrogators in the RFID system must know the password in order to be able to access the entire non-volatile memory of the RFID tag for reading and logging. Yet, access cannot be allowed to particular interrogators only.

There are also known RFID systems, in which interrogators are allowed to read, if they use a password. The unciphered password is transmitted in a non-protected way between the interrogator and the RFID tag. The password can therefore be intercepted in a nonauthorized way. It can be used for unlocking and unpermitted modification of the data in the non-volatile memory NVM within the active RFID tag.

The technical problem of the invention is to put forward such method for initialization of an active RFID tag by an interrogator that thereafter the interrogator will not be able to write in a logging area of a non-volatile memory of the tag, but only less numerous data that characterize a process in a tagged article and originate from values of a physical parameter acquired by a sensor will be logged in said logging area in a secure and non-volatile manner.

Said technical problem is solved by the method of the invention for a secure non-volatile logging in an active RFID tag of a process running in a tagged article as characterized by the features of the characterizing portion of the first claim. Dependent claims, however, characterize the variants of the embodiment.

The method of the invention for a secure non-volatile logging in an active RFID tag of a process running in a tagged article is distinguished in that the process data logged in the logging area of the non-volatile memory of the tag cannot be modified in any way at a later stage. Moreover, the invention also provides for an efficient observation of longer period of the process in the tagged article in order to inspect the usability of said article.

Figure 2:
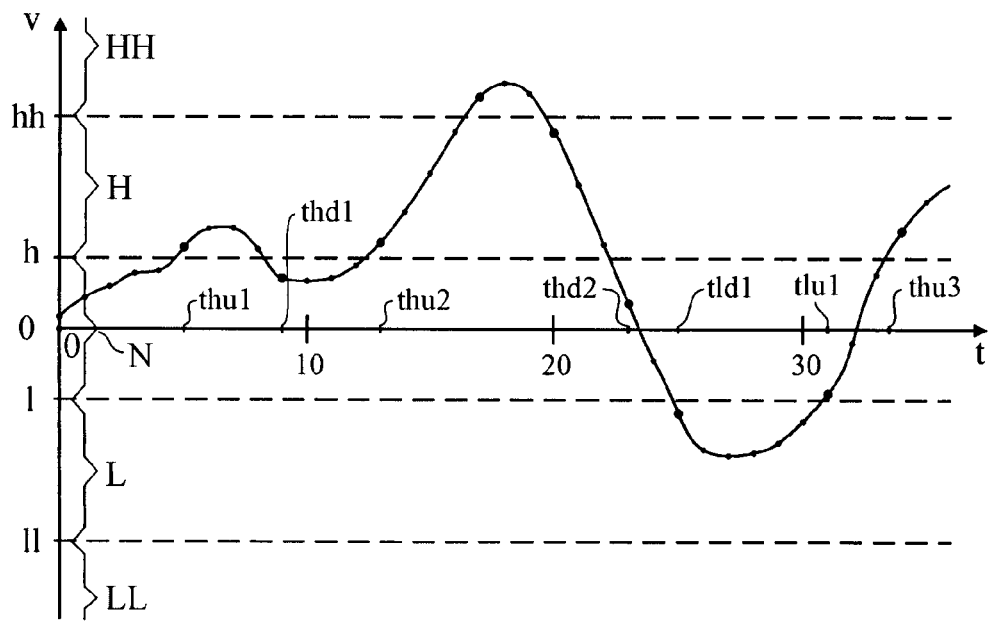
Figure 3:
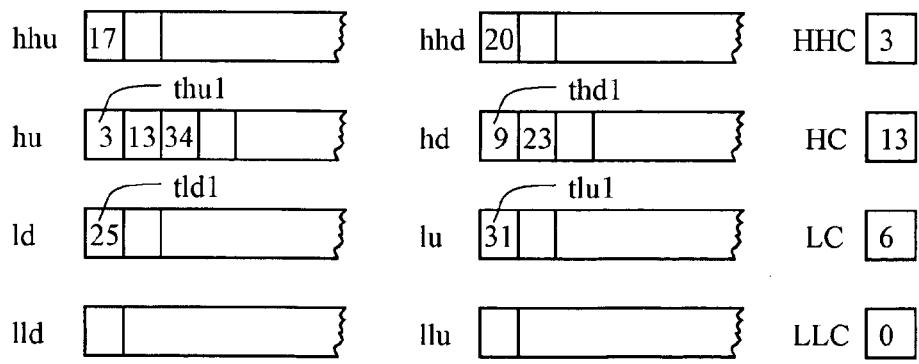

The invention will now be explained in more detail by way of the description of an embodiment as well as its variants and with reference to the accompanying drawing representing in:

FIG. 1 illustrating an example of a non-volatile memory NVM within the active RFID tag divided into three areas, FIG. 2 time dependence of values of a physical parameter, which were acquired in subsequent sampling periods and determine a process in a tagged article at the acquisition time, as well as limits of the values of said physical parameter, which limits are relevant to ascertain usability of the tagged article at the end of the observation, and FIG. 3 first the addresses for logging acquisition times immediately after the value of said physical parameter traversed said limits in upward or downward direction are logged, and then also the first, second, third and fourth addresses for logging the total number of occurence of the value of said physical parameter in a particular interval of the values of said physical parameter as determined by said limits.

A method of the invention for a secure logging of a process, which runs in a tagged article and for which the relevant values of a physical parameter are acquired by a sensor in subsequent sampling periods, in a logging area LA within a non-volatile memory NVM of an active RFID tag (FIG. 1)

starts by initializing an integrated circuit of the tag by means of an interrogator as proposed by the invention.

Prior to said logging lock flags, inter alia, are set to state 1 at all addresses of the logging area LA within the non-volatile memory NVM of the tag (FIG. 1) by means of a single instruction by the interrogator as proposed by the invention. Said instruction executes as many operations of locking individual addresses as many addresses are foreseen for logging in the logging area LA.

All addresses in the logging area LA within the non-volatile memory NVM of the active RFID tag got locked to writing through the interrogator according to the invention in the described way. The lock flag state 1 cannot later be changed anymore. By means of initialization, however, the user himself first also determined the necessary number of addresses in the logging area LA.

If a communication interface in the active RFID tag receives an instruction write block at a particular address in the logging area LA, it reads the state of the lock flag at said address. As the lock flag is in the state 1 at any address in the logging area LA, the communication interface does not allow the interrogator to write at said address in the active RFID tag initialized according to the invention.

A data logger has a direct access to the logging area LA. It can therefore keep logging regardless of the state of the lock flag at the particular address within the logging area LA. Hence the presented first step of the method of the invention did not prevent such logging of said process running in the tagged article in the logging area LA within the non-volatile memory NVM of the active RFID tag. However, said data log written by the data logger will be secure against any modification or falsification by means of the interrogator.

The following steps of the method of the invention make it possible that only those less numerous data, which substantially characterize said process in the tagged article, are logged in a disclosed secure manner in the non-volatile memory NVM of the tag. Said data certainly originate from the values of said physical parameter as acquired by the sensor in the active RFID tag.

The user first determines a high limit h as well as a low limit l of an interval l-h of the values v of said physical parameter, which are proper for the tagged article to preserve its usability even after a lapse of the observation period, i.e. the period needed for road or ship transport (FIG. 2).

According to the basic embodiment of the invention the data logger then converts the acquired values of said physical parameter and the acquisition times related thereto into less numerous data characterizing said process. Said conversion observes the high limit h and the low limit l of a normal interval N or of the interval l-h of said proper values of said physical parameter.

And finally, said data characterizing the process are logged in said logging area LA within the non-volatile memory NVM of the active RFID tag.

In the first variant embodiment, the conversion of the values of said physical parameter acquired by the sensor and of the acquisition times related thereto into said less numerous data characterizing said process is performed by logging only that value of said physical parameter and the acquisition times related thereto into the logging area LA, in which the acquired value of said physical parameter lies outside the interval N of normal values v of said physical parameter, which are proper for retaining usability of the tagged article.

A variation of the value v of said physical parameter with time t, which is measured in units of the sampling period sp, for an simulated process is represented in FIG. 2.

22 acquired values are situated outside the normal interval N. Only these are logged in the logging area LA within the non-volatile memory NVM of the active RFID tag. The number (22) of logged values is much lower than the number (36) of the values of said physical parameter acquired by the sensor, although the simulated process is quite instable.

In the second variant embodiment the conversion of the values of said physical parameter acquired by the sensor and of the acquisition times related thereto said less numerous data characterizing said process is performed by logging into the logging area LA only the acquisition times thui, thdi; tldi, tlui placed immediately after the value of said physical parameter traversed the high limit h in upward and downward direction, respectively, and the low limit l in downward and upward direction, respectively. The index i denotes a serial number of the traversal of each kind.

Only said acquisition times thui, thdi; tldi, tlui placed immediately after the value of said physical parameter traversed the high limit h in upward and downward direction, respectively, and the low limit l in downward and upward direction, respectively, are logged. They are logged in memory areas hu, hd, ld and lu, respectively, inside the logging area LA within the non-volatile memory NVM of the active RFID tag (FIG. 3). FIG. 3 represents the detected course of the process for the period from the putting the tag into operation to the end of the thirty fifth sampling period sp.

The data on said acquisition times thui, thdi; tldi, tlui placed immediately after the value of said physical parameter traversed the high limit h in upward and downward direction, respectively, and the low limit l in downward and upward direction, respectively, as such are enough to derive the information essential for inspecting and finding out whether the tagged article remained usable also after the observation duration. Said traversal times can be used to calculate the total time, during which the value v of said physical parameter was above the high limit h, and also the total time, during which the value v of said physical parameter was below the low limit l. A reconstruction of the time development of the process can be performed as well.

In the second variant embodiment the number (7) of the data logged inside the logging area LA within the non-volatile memory NVM of the active RFID tag is substantially lower than the number (36) of the values of said physical parameter as acquired by the sensor, despite the fact that the simulated process is quite instable. The ratio of said two numbers for real stabilized processes is very high. The number of data to be logged is thus heavily reduced according to the invention.

The method in the first and second variant embodiments can be improved according to the invention in the following manner: each occurence of the value v of said physical parameter above the high limit h increases the state at a first selected address HC in the logging area LA within the non-volatile memory NVM by 1 and each occurence of the value v of said physical parameter below the low limit l increases the state at a second selected address LC in the logging area LA within the non-volatile memory NVM of the tag by 1.

Said first selected address HC and said second selected address LC represent counters counting the total number of sampling periods sp, during which the tagged article was in the state with the value v of said physical parameter above the high limit h and below the low limit l, respectively, i.e. in an improper state.

A possibility of logging at chosen addresses HC and LC is not limited by the length of the observation period and logging is carried out also when the memory areas hu, hd, ld and lu already got filled due to a long observation period. Even in such case the user will get data on exceeding the high limit h as well as the low limit l.

After the thirty fifth sampling period sp elapsed, the following total times of presence of the tagged article above or below the normal interval N are read out; the counter HC shows 16 sampling periods sp and the counter LC shows 6 sampling periods sp.

FIG. 2 and FIG. 3 represent a variant embodiment improved in the following way and described below.

The process running in the tagged article according to the invention can be described in a smoother way in that a very high limit hh lying above said high limit h and a very low limit ll lying below said low limit l of said interval l-h of proper values of said physical parameter are additionally determined. The acquired values v of said physical parameter and the acquisition times related thereto are now also converted into less numerous data characterizing said process by observing the high limit h, the very high limit hh, the low limit l and the very low limit ll.

This means that besides the normal interval N of the values v of said physical parameter a new high interval H between the values h and hh and also a very high interval HH above the value hh, a new low interval L between the values l and ll and also a very low interval LL below the value ll are obtained. According to the improved second variant embodiment only acquisition times thui, thhui, thhdi, thdi, tldi, tlldi, tllui and tlui placed immediately after the value of said physical parameter traversed the high limits h, hh and the low limits l, ll in upward and downward direction are logged in memory areas hu, hhu, hhd, hd, ld, lld, llu and lu, respectively, inside the logging area LA. There are now four selected addresses: HC, HHC, LC and LLC.

In order to achieve additional security, system area SA, user area UA and logging area LA within the non-volatile memory NVM of the tag are protected according to the invention, each one by means of its own password for the access of the interrogator to the respective area. Said passwords are independent of each other. A particular interrogator can access some areas but it does not know passwords for the access to other areas. In the logging area LA logged data remain protected against modification even when the password pertaining thereto was detected.

The invention claimed is:

1. A method for a secure non-volatile logging in an active RFID tag of a process running in a tagged article in that in subsequent sampling periods a sensor acquires values of a physical parameter, which values determine said process running in the tagged article at the acquisition times, whereat a high limit (h) and a low limit (l) of an interval (l-h) of such values of said physical parameter are determined, which are proper for retaining usability of the tagged article, and the acquired values of said physical parameter and the acquisition times related thereto are converted into less numerous data characterizing said process by a data logger by observing the high limit (h) and the low limit (l) of the interval (l-h) of said values of said physical parameter, which are proper for retaining usability of the tagged article, characterized in that prior to said logging flags for locking at all addresses of a logging area within a non-volatile memory of the tag are set to state 1 by means of an interrogator, and that said data characterizing said process are logged in said logging area within the non-volatile memory of the tag, wherein the data logger has a direct access to the logging area and is able to log regardless of the state of the flag for locking at the particular address within the logging area, and wherein an interrogator is not allowed to write at said address, if the flag for locking is in the state 1.

2. The method as recited in claim 1, characterized in that the acquired values of said physical parameter and the acquisition times related thereto are converted into said less numerous data characterizing said process by logging the acquired values of said physical parameter and the acquisition times related thereto, in which acquisition times the acquired value of said physical parameter lies outside the interval (l-h) of said values of said physical parameter, which are proper for retaining usability of the tagged article.

3. The method as recited in claim 1, characterized in that the acquired values of said physical parameter and the acquisition times related thereto are converted into said less numerous data characterizing said process by logging only the acquisition times (thui, thdi; tldi, tlui) immediately after the value of said physical parameter traversed the high limit (h) in upward and downward direction, respectively, and the low limit (l) in downward and upward direction, respectively.

4. The method as recited in claim 2, characterized in that each occurrence of the value of said physical parameter above the high limit (h) increases the state at a first selected address in the logging area within the non-volatile memory of the tag by 1 and that each occurrence of the value of said physical parameter below the low limit (l) increases the state at a second selected address in the logging area within the non-volatile memory of the tag by 1.

5. The method according to claim 1, characterized in that a very high limit (hh) lying above said high limit (h) and a very low limit (ll) lying below said low limit (l) of said interval (l-h) of such values of said physical parameter, which are proper for retaining usability of the tagged article, are additionally determined and that the acquired values of said physical parameter and the acquisition times related thereto are converted into said less numerous data characterizing said process by observing the high limit (h), the very high limit (hh), the low limit (ol) and the very low limit (ll) of the interval (l-h) of the proper values of said physical parameter for retaining usability of the tagged article.

6. The method according to claim 1, characterized in that system area, user area and logging area, which are all situated within said non-volatile memory, are protected by means of its own password for the access of the interrogator to the respective area said passwords being independent of each other.

* * * * *